(12) United States Patent
Forrest et al.

(10) Patent No.: US 9,148,005 B2
(45) Date of Patent: Sep. 29, 2015

(54) WALL MOUNTED ELECTRICAL DEVICE COVER PLATE ASSEMBLY

(71) Applicant: LIBERTY HARDWARE MFG. CORP., Winston-Salem, NC (US)

(72) Inventors: Earl David Forrest, Asheboro, NC (US); James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 82 days.

(21) Appl. No.: 13/827,487

(22) Filed: Mar. 14, 2013

(65) Prior Publication Data

US 2014/0262419 A1    Sep. 18, 2014

(51) Int. Cl.
*H02G 3/14* (2006.01)
*H02G 3/10* (2006.01)

(52) U.S. Cl.
CPC ... *H02G 3/14* (2013.01); *H02G 3/10* (2013.01)

(58) Field of Classification Search
CPC .................. H05K 2201/10325; H01R 13/447; H01R 13/506; H01R 13/6395; H01R 13/5213; H01R 13/11; H02G 3/14; H02G 3/083; H02G 3/10; E05C 19/06
USPC .......... 361/807–810, 816–818; 439/527, 535, 439/536, 538, 136, 143–147; 174/50, 174/55–58, 65, 66, 67
See application file for complete search history.

(56) References Cited

U.S. PATENT DOCUMENTS

| | | | |
|---|---|---|---|
| 327,212 A | 9/1885 | Williams | |
| 1,829,422 A | 10/1931 | Seltzer | |
| 2,515,820 A | 7/1950 | Clark | |
| 2,565,636 A | 8/1951 | Tinnerman | |
| 2,740,873 A | 4/1956 | Cronk | |
| D236,948 S | 9/1975 | Mori | |
| D237,043 S | 10/1975 | Mori | |
| D237,044 S | 10/1975 | Mori | |
| D237,045 S | 10/1975 | Mori | |
| 3,953,933 A | 5/1976 | Goldstein | |
| 4,009,797 A | 3/1977 | Lee | |
| 4,500,746 A | 2/1985 | Meehan | |
| 4,631,354 A | 12/1986 | Boteler | |

(Continued)

FOREIGN PATENT DOCUMENTS

| | | |
|---|---|---|
| AU | 2012216297 A1 | 3/2013 |
| EP | 1737008 B1 | 3/2013 |

(Continued)

*Primary Examiner* — Timothy Thompson
*Assistant Examiner* — Ahmad D Barnes
(74) *Attorney, Agent, or Firm* — Brooks Kushman P.C.; Lora Graentzdoerffer

(57) ABSTRACT

A cover plate assembly is provided with a cover plate with a substrate adapted to be mounted upon a substrate of a subplate mounted to an electrical device for enclosing the electrical device. A rim extends from a periphery of the cover plate substrate. The fastener is engaged with the cover plate to engage the detent in a periphery of the subplate for fastening the cover plate to the subplate. The fastener is a separate component than the cover plate and the subplate. The fastener is concealed beneath the cover plate. In another embodiment, the cover plate is metallic and the fastener is formed integrally with the cover plate. In another embodiment, a first fastener fastens the subplate to the electrical device. A second fastener is engaged with the cover plate and the first fastener for fastening the cover plate to the first fastener.

16 Claims, 16 Drawing Sheets

(56) References Cited

U.S. PATENT DOCUMENTS

| | | |
|---|---|---|
| 4,733,330 A | 3/1988 | Tanaka et al. |
| 4,780,573 A | 10/1988 | Own |
| 4,800,239 A | 1/1989 | Hill |
| 4,803,380 A | 2/1989 | Jacoby, Jr. et al. |
| 4,833,277 A | 5/1989 | Jacoby, Jr. et al. |
| 4,835,343 A | 5/1989 | Graef et al. |
| 4,873,396 A | 10/1989 | Guity-Mehr |
| 5,041,698 A | 8/1991 | Takagi et al. |
| 5,073,681 A | 12/1991 | Hubben et al. |
| 5,153,816 A | 10/1992 | Griffin |
| 5,180,886 A | 1/1993 | Dierenbach et al. |
| 5,189,259 A | 2/1993 | Carson et al. |
| 5,456,373 A | 10/1995 | Ford |
| 5,577,602 A | 11/1996 | Conner et al. |
| 5,675,125 A | 10/1997 | Hollinger |
| D388,398 S | 12/1997 | Jeong |
| 5,723,817 A | 3/1998 | Arenas et al. |
| D394,042 S | 5/1998 | Hwang |
| 5,811,729 A | 9/1998 | Rintz |
| D408,792 S | 4/1999 | Hwang |
| 5,895,888 A | 4/1999 | Arenas et al. |
| 5,955,702 A | 9/1999 | Grossman et al. |
| 6,130,384 A | 10/2000 | Esteves et al. |
| 6,218,617 B1 | 4/2001 | Estanislao et al. |
| 6,329,596 B1 | 12/2001 | Justiniano et al. |
| 6,359,219 B1 | 3/2002 | Reid et al. |
| 6,538,202 B1 | 3/2003 | Shaffer et al. |
| 6,679,725 B2 | 1/2004 | Kidman |
| D493,695 S | 8/2004 | Wengrower |
| D508,198 S | 8/2005 | Holger |
| D511,675 S | 11/2005 | Holger |
| 6,974,910 B2 | 12/2005 | Rohmer |
| D518,446 S | 4/2006 | Hedderich et al. |
| D518,793 S | 4/2006 | Hedderich et al. |
| D518,794 S | 4/2006 | Hedderich et al. |
| 7,030,318 B2 | 4/2006 | Tufano et al. |
| D519,939 S | 5/2006 | Hedderich et al. |
| 7,071,414 B2 | 7/2006 | Kim |
| 7,075,009 B1 | 7/2006 | Rohmer |
| 7,102,081 B2 | 9/2006 | Xu et al. |
| D529,787 S | 10/2006 | Swiencicki et al. |
| 7,122,740 B2 | 10/2006 | Xu et al. |
| 7,176,380 B2 | 2/2007 | Tufano et al. |
| D542,627 S | 5/2007 | Rohmer et al. |
| 7,230,183 B2 | 6/2007 | Oddsen et al. |
| 7,244,891 B2 | 7/2007 | Schmieta et al. |
| 7,247,792 B2 | 7/2007 | Tufano et al. |
| 7,250,580 B2 | 7/2007 | Kurek et al. |
| D550,076 S | 9/2007 | Ni |
| 7,271,338 B1 | 9/2007 | Rohmer |
| 7,279,636 B2 | 10/2007 | Oddsen et al. |
| 7,282,642 B2 | 10/2007 | Schmieta et al. |
| 7,285,723 B2 | 10/2007 | Lindenstraus et al. |
| 7,294,782 B2 | 11/2007 | Lindenstraus et al. |
| 7,318,732 B2 | 1/2008 | Kidman |
| D562,780 S | 2/2008 | Egea Soler |
| D570,790 S | 6/2008 | Egea Soler |
| 7,425,681 B2 | 9/2008 | Xu et al. |
| 7,435,903 B2 | 10/2008 | Tufano et al. |
| D581,369 S | 11/2008 | Egea Soler |
| 7,456,358 B2 | 11/2008 | Swiencicki et al. |
| 7,456,360 B2 | 11/2008 | Schmieta et al. |
| 7,674,976 B2 | 3/2010 | Eastin |
| 7,683,257 B1 | 3/2010 | Shotey et al. |
| 7,700,888 B2 | 4/2010 | Kurek et al. |
| 7,732,710 B2 | 6/2010 | Oddsen et al. |
| 7,947,903 B2 * | 5/2011 | Peck ........................ 174/66 |
| 7,960,651 B2 | 6/2011 | Alderson et al. |
| D649,122 S | 11/2011 | Jacoby et al. |
| 8,067,690 B2 | 11/2011 | Anders et al. |
| D652,390 S | 1/2012 | Boehm et al. |
| RE43,156 E | 2/2012 | Lindenstraus et al. |
| 8,148,637 B2 | 4/2012 | Davidson |
| 8,212,146 B1 | 7/2012 | Moore |
| 8,222,521 B2 | 7/2012 | Kimbrell et al. |
| 8,222,522 B1 | 7/2012 | Easthouse |
| 8,232,482 B2 | 7/2012 | Arbel |
| 8,237,064 B2 | 8/2012 | Trolese et al. |
| 8,238,755 B2 | 8/2012 | Yamamoto et al. |
| 8,242,364 B1 | 8/2012 | Shotey et al. |
| 8,243,918 B2 | 8/2012 | Hazani et al. |
| 8,245,862 B2 | 8/2012 | Gates, II |
| 8,258,401 B1 | 9/2012 | Shotey et al. |
| 8,277,254 B2 | 10/2012 | Yamamoto et al. |
| 8,294,028 B2 | 10/2012 | Huang |
| 8,299,358 B2 | 10/2012 | Huang |
| 8,299,359 B2 | 10/2012 | Alderson et al. |
| 8,334,459 B2 | 12/2012 | Chaumeny et al. |
| 2006/0086525 A1 | 4/2006 | Xu et al. |
| 2008/0035364 A1 | 2/2008 | O'Young et al. |
| 2008/0113535 A1 | 5/2008 | Kidman |
| 2009/0126968 A1 | 5/2009 | Glas |
| 2010/0132972 A1 | 6/2010 | Chaumeny et al. |
| 2010/0133000 A1 * | 6/2010 | Trolese et al. ............ 174/503 |
| 2011/0048760 A1 | 3/2011 | Huang |
| 2011/0061885 A1 | 3/2011 | Wilson |
| 2011/0209891 A1 | 9/2011 | Huang |
| 2012/0003885 A9 | 1/2012 | Lindenstraus et al. |
| 2012/0125653 A1 | 5/2012 | Davidson |

FOREIGN PATENT DOCUMENTS

| | | |
|---|---|---|
| FR | 2986669 A1 | 8/2013 |
| GB | 2085229 A | 4/1982 |

* cited by examiner

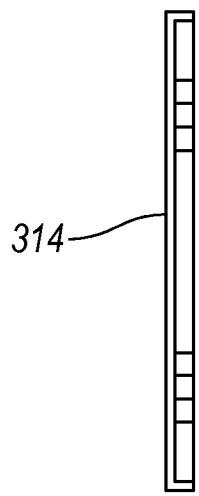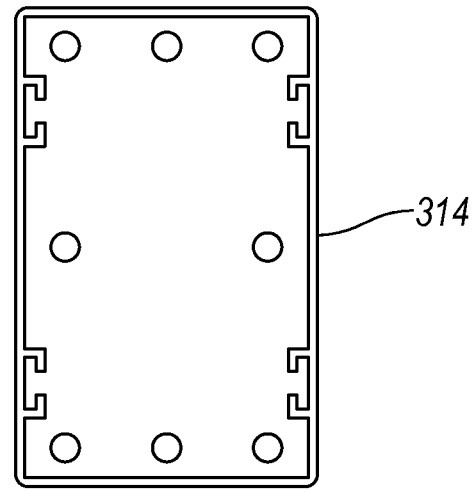
FIG. 34  FIG. 33
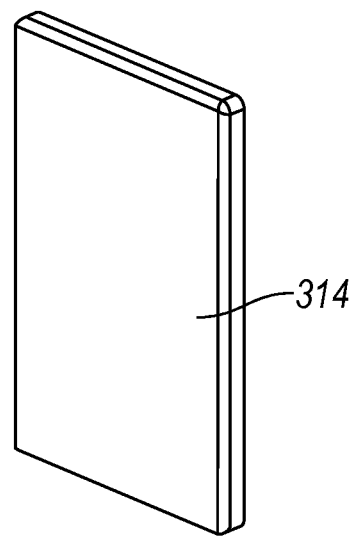
FIG. 35

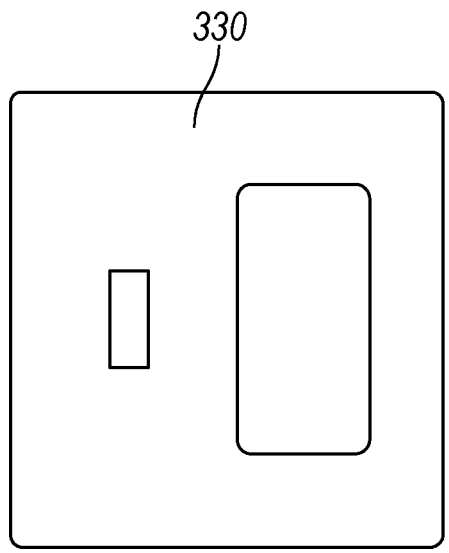
FIG. 42
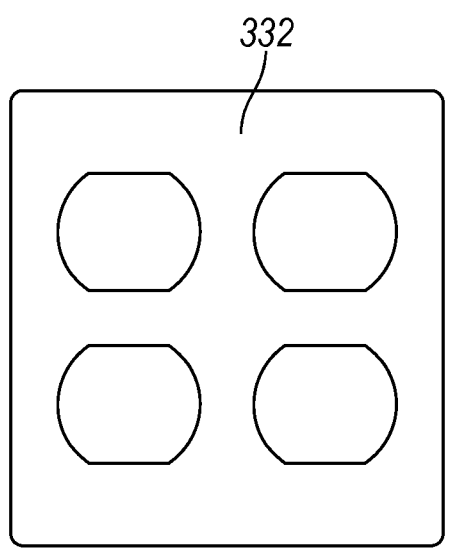 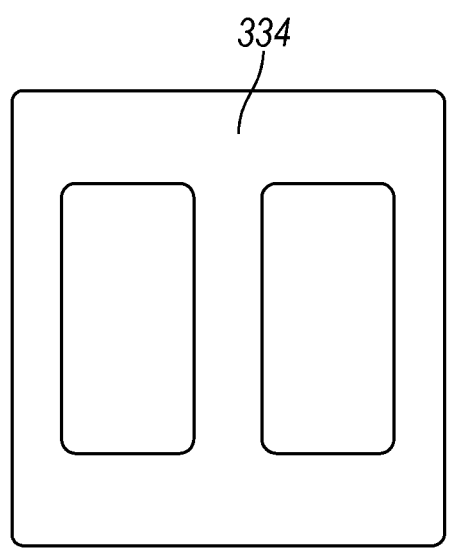
FIG. 43  FIG. 44

WALL MOUNTED ELECTRICAL DEVICE COVER PLATE ASSEMBLY

TECHNICAL FIELD

Various embodiments relate to cover plate assemblies for wall mounted electrical devices.

BACKGROUND

The prior art has offered various cover plate assemblies for wall mounted electrical devices. The cover plate assemblies often employ externally visible fasteners. The prior art has also offered cover plate assemblies with concealed fasteners. Such cover plates are often formed of a plastic material with integral fasteners. The National Electrical Manufacturers Association has provided a standard ratio tolerance between long and short sides on a single gang wall plate of 1.4 to 1 minimum.

SUMMARY

According to at least one embodiment, a cover plate assembly is provided with a cover plate with a substrate adapted to be mounted upon a substrate of a subplate mounted to an electrical device for enclosing the electrical device. A rim extends from a periphery of the cover plate substrate. At least one fastener is engaged with the cover plate to engage at least one detent in a periphery of the subplate for fastening the cover plate to the subplate. The at least one fastener is a separate component than the cover plate and the subplate. The at least one fastener is concealed beneath the cover plate.

According to at least another embodiment, a cover plate assembly is provided with a metallic cover plate with a substrate adapted to be mounted upon a substrate of a subplate mounted to an electrical device for enclosing the electrical device. A rim extends from a periphery of the cover plate substrate. At least one fastener extends from the cover plate to engage at least one detent in the subplate for fastening the cover plate to the subplate. The at least one fastener is formed integrally with the cover plate.

According to at least another embodiment, a cover plate assembly is provided with a subplate with a substrate mounted to an electrical device for enclosing the electrical device. A first fastener fastens the subplate to the electrical device. A cover plate is provided with a substrate adapted to be mounted to the subplate substrate. A second fastener is engaged with the cover plate and the first fastener for fastening the cover plate to the first fastener.

According to at least one embodiment, a cover plate assembly is provided with a subplate with a substrate adapted to be mounted to an electrical device for enclosing the electrical device. A rim extends from a periphery of the substrate. The rim has at least one detent formed therein. A cover plate with a substrate is adapted to be mounted upon the subplate substrate. A rim extends from a periphery of the cover plate substrate. The cover plate rim has at least one receptacle formed therein. At least one spring clip is retained in the at least one receptacle and the at least one spring clip is engaged with the at least one detent for fastening the cover plate to the subplate.

BRIEF DESCRIPTION OF THE DRAWINGS

FIG. 33 is a rear elevation view of the cover plate of FIG. 32;

FIG. 34 is a section view of the cover plate of FIG. 32;

FIG. 35 is a perspective view of the cover plate assembly of FIG. 32;

FIG. 42 is a front elevation view of a cover plate for a cover plate assembly for a wall mounted electrical device according to another embodiment;

FIG. 43 is a front elevation view of a cover plate for a cover plate assembly for a wall mounted electrical device according to another embodiment;

FIG. 44 is a front elevation view of a cover plate for a cover plate assembly for a wall mounted electrical device according to another embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
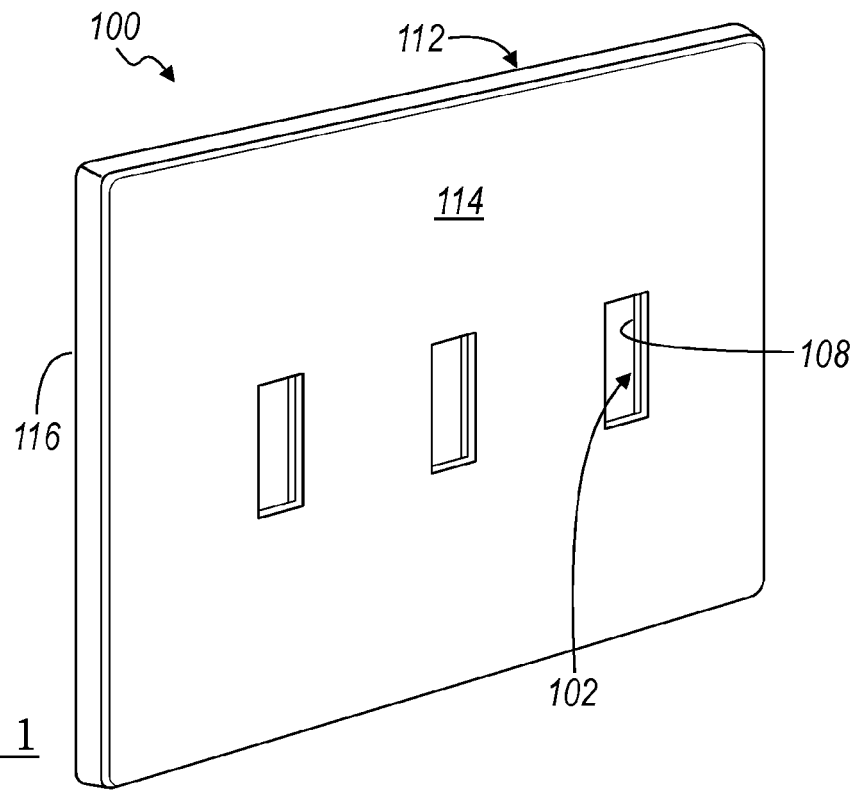
FIG. 1 is a perspective view of a cover plate assembly for a wall mounted electrical device according to at least one embodiment.
Figure 2:
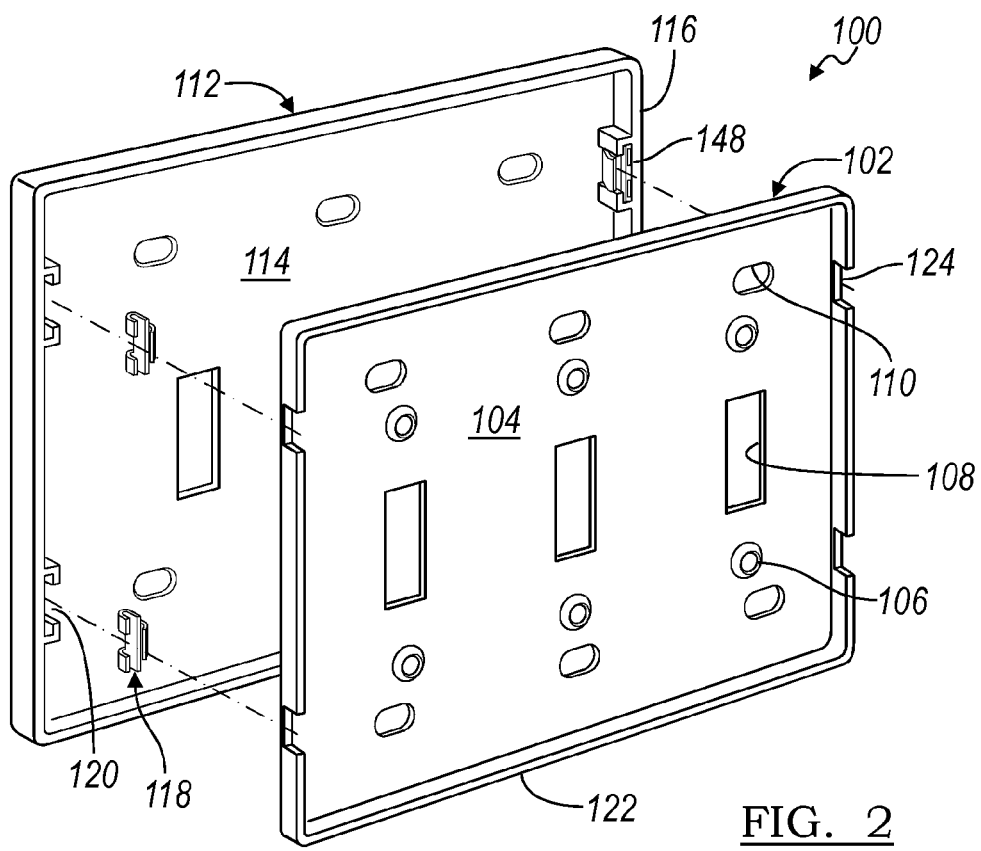
FIG. 2 is an exploded perspective view of the cover plate assembly of FIG. 1.
Figure 3:
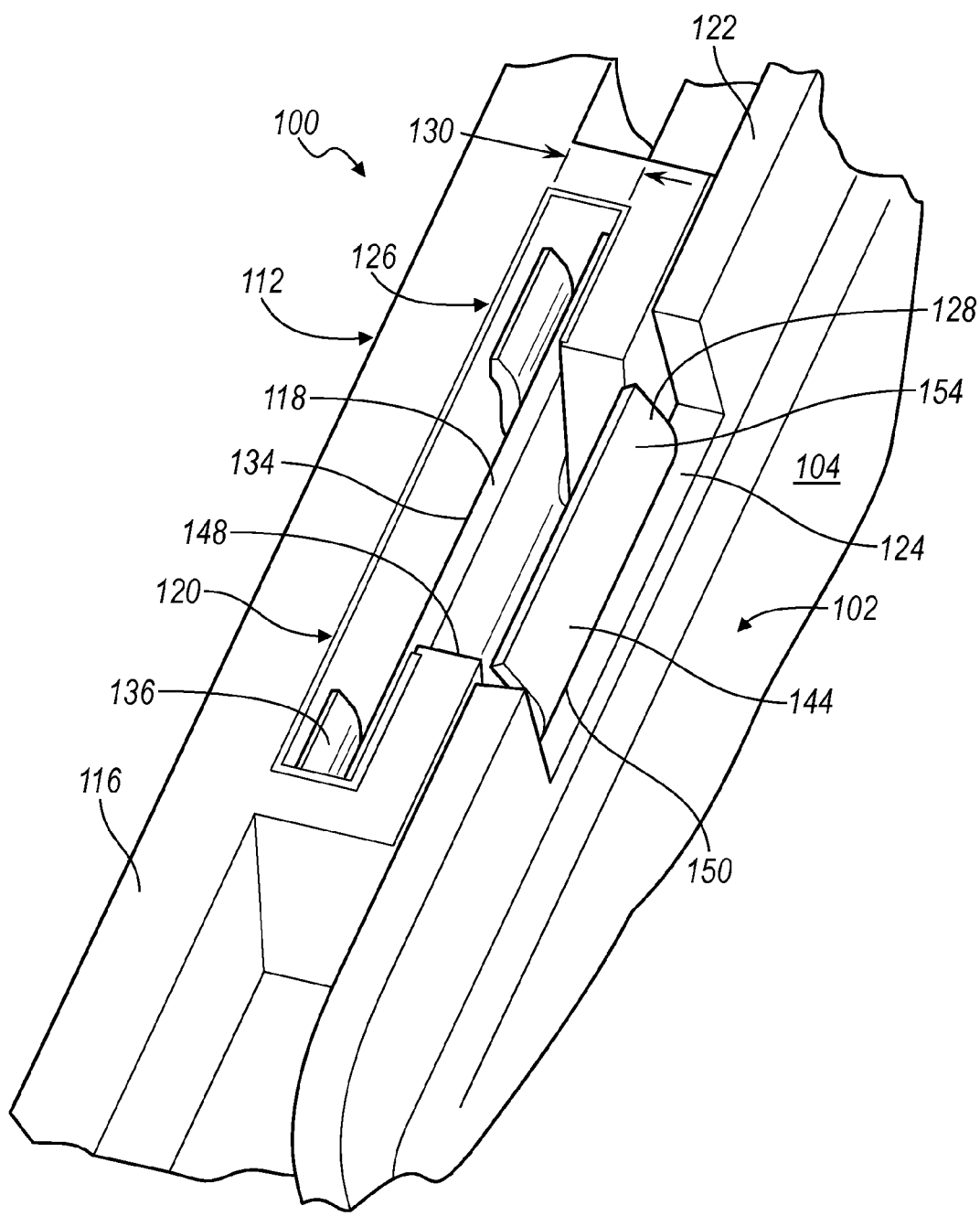
FIG. 3 is an enlarged partial rear perspective view of the cover plate assembly of FIG. 1.

Referring to FIGS. 1 and 2, a cover plate assembly 100 is illustrated for covering and enclosing a wall mounted electrical device. For example, the cover plate assembly 100 is depicted for covering a three-gang electrical switch. Wall mounted electrical devices are typically standardized with a yoke with threaded apertures for receipt of threaded fasteners for installing a cover plate. Accordingly, a subplate 102 (FIG. 2) is provided with a substrate 104 that is adapted to be mounted to the electrical device for enclosing the electrical device. The substrate 104 may, for example, include a series of countersunk apertures 106 for receipt of heads of threaded fasteners for fastening the subplate 102 to the yoke of the electrical device. The apertures 106 may be oriented in any suitable pattern associated with a fastener pattern of an electrical device.

A height and a width of the subplate 102 are sized to effectively cover a standard electrical wall box opening. The substrate 104 of the subplate 102 may also include clearance apertures 108 aligned with a fastener pattern for securing the electrical device within a junction box. The clearance apertures 108 permit the substrate 104 to abut the yoke of the electrical device. The substrate 104 also includes access openings 110 for access to the electrical device.

The subplate 102 can be fabricated of a pre-galvanized stamped steel in order to meet corrosion resistance requirement of Underwriters Laboratories Standard UL514D (Cover Plates for Flush-Mounted Wiring Devices). The access openings 110 within the substrate 104 of the subplate 102 are utilized to make adjustments of the electrical devices. The overall size of the subplate 102, the countersunk apertures 106, and clearance apertures 108 are sized and designed to meet National Electrical Manufacturers Association (NEMA) standard WD6 which covers Wiring Device Dimensional Specifications. Typically, the access openings 110 are fitted for standard toggle switches, antique push button switches, duplex devices and Ground Fault Circuit Interruptor (GFCI) receptacles, and the like.

The cover plate assembly 100 also includes a decorative cover plate 112 for covering the subplate 102. The cover plate 112 also has a substrate 114 that is sized to be mounted upon the subplate substrate 104. A peripheral rim 116 extends from the cover plate substrate 114 for engaging the wall and concealing the subplate 102. A series of fasteners 118 (FIG. 2) are provided beneath the cover plate 112 in engagement with the cover plate 112 and the subplate 102 for fastening the cover plate 112 to the subplate 102. Once installed, the series of fasteners 118 are concealed beneath the cover plate 112.

For the depicted embodiment, the fasteners 118 are spring clips as illustrated in FIGS. 2-6. The spring clips 118 can be formed from a spring steel alloy. The cover plate 112 includes a plurality of receptacles 120 (FIGS. 2-4), which may be formed within the rim 116 for receipt of the spring clips 118. Likewise, the subplate 102 also includes a rim 122 extending from a periphery of the subplate substrate 104. A plurality of detents is provided by notches 124 formed in the subplate rim 122.

The two-piece cover plate assembly 100 permits attachment of the decorative cover plate 112 which is free of mounting screw openings. The fastener arrangement with the spring steel clips 118 allows the decorative cover plate 112 to easily engage and be secured to the subplate 102. The interchangeability of the cover plate 112 permits alternate decorative cover plate designs to be available to the consumer. The interchangeability also allows removal of the existing cover plate 112; and replacing the cover plate 112 with an alternative design without removing the subplate 102 and without requiring tools for changing the cover plate 112.

Figure 4:
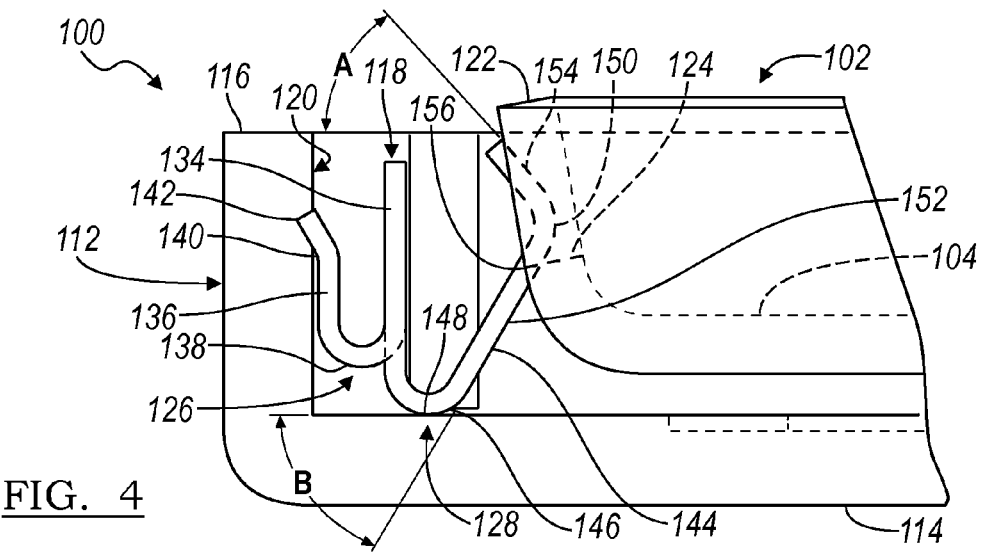
FIG. 4 is an enlarged partial section view of the cover plate assembly of FIG. 1.
Figure 5:
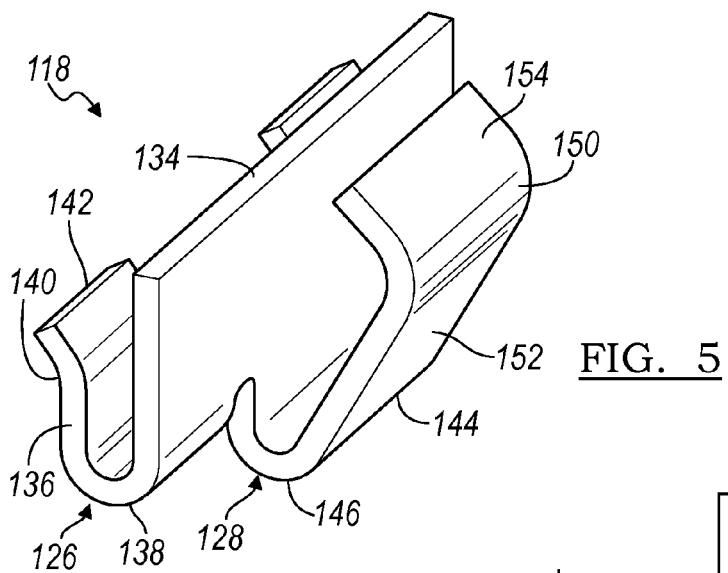
FIG. 5 is an enlarged perspective view of a fastener of the cover plate assembly of FIG. 1.
Figure 6:
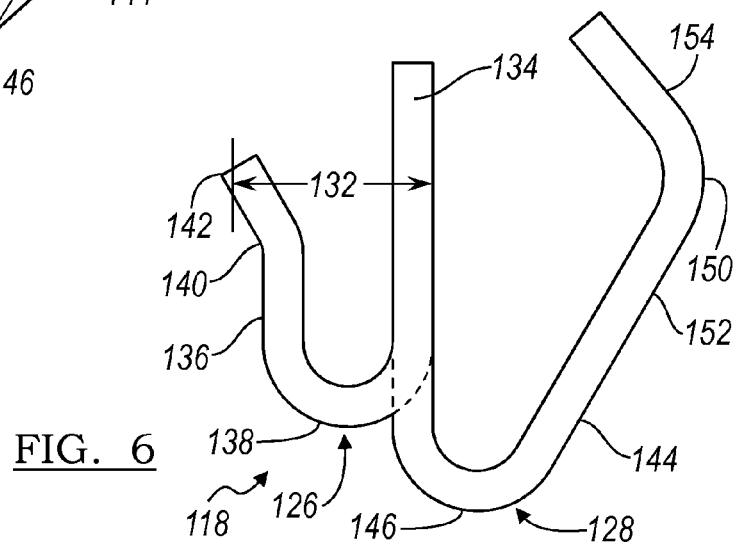
FIG. 6 is an enlarged side view of the fastener of FIG. 5.

When the subplate 102 is assembled to the electrical device, and makes contact with the wall an overall projected thickness of the subplate from the wall is greater than a recess on the back of the cover plate 112 as depicted in FIG. 4. This geometry difference creates a small gap between the fully installed cover plate 112 and the wall to ensure that the cover plate 112 fully engages the spring clips 118.

Historically, hidden fastener wall plates or cover plates have been designed with polymeric materials. Polymeric materials allow for flexible features to be included directly within the subplate or cover plate as an example for purposes of temporary attachment. These plastics are typically made with flame retardant additives which may be harmful to human health during manufacturing and are not readily recyclable at end of life. By avoiding polymeric materials, a product can be made which has no harmful health affects in production or use and is readily recyclable. Also, most polymeric materials do not readily accept plated metallic decorative finishes which can limit finish choices to the consumer. In addition, plated acrylonitrile butadiene styrene (ABS) materials, which are common in some consumer products, result in material contamination of both the plastic and the metal, making recycling of these materials undesirable from an economics perspective. The plastic material must be at least 2.5 millimeters thick to meet the applicable standards. However, the steel subplate 102 meets the applicable standards at a thickness of less than 2.5 millimeters. The steel subplate 102 meets the applicable standards with a thickness of at least 0.8 millimeters thereby offering a reduced thickness in comparison to plastic.

Metals which are typical to decorative cover plates such as zinc die-cast lack the flexibility needed to create snap features which are required for a hidden fastener wall plate designs. Hidden fastener wall plate designs typically gain UL approval as a complete assembly. In contrast, the subplate 102 meets the industry requirements alone. This approach allows for a wider use of materials for the purposes of manufacturing the hidden fastener decorative cover plate 112 from materials which could not pass industry standards on their own. Materials which could be used for the hidden fastener decorative cover plate 112 may be metal, wood, plastic, resin, glass, stone or ceramic, epoxy, or any decorative material.

Referring again to FIGS. 3-6, the metal spring clips 118 provide two functions. A first region 126 of the spring clip 118 provides a retainer for retaining the spring clips 118 in the receptacles 120. A second region 128 of the spring clips 118 is a fastener region for fastening the cover plate 112 to the subplate 102.

The retention of the spring clip 118 is achieved by insertion of the spring clip retainer region 126 into the receptacle 120. The receptacle 120 has a lateral inner dimension 130 that is less than an overall dimension 132 of the spring clip retainer region 126. The spring clip 118 includes a first spring arm 134 and a pair of secondary spring arms 136 spaced apart and opposed from the first spring arm 134 by a first bend 138 to collectively provide the spring clip retainer region 126. A second bend 140 is provided on the secondary spring arms to expand the dimension 132 of the retainer region 126 and to resist removal of the spring clip 118 by providing a sharp edge 142 for dragging against the receptacle 120.

A third spring arm 144 extends from the first spring arm 134 at a third bend 146 for providing the fastener region 128. The third spring arm 144 may be formed between the secondary spring arms 136 and bent in opposed directions. The third bend 146 provides a datum reference point or stop for engaging the cover plate substrate 114 and limiting further installation. The third bend 146 as a datum point minimizes assembly tolerances and manufacturing costs. A clearance notch 148 is provided in each receptacle 120 for permitting the third spring arm 144 to extend from the receptacle 120. A fourth bend 150 is provided on the third spring arm 144 for providing a pair of leading surfaces 152, 154 upon the third spring arm 144. During installation, the leading surface 154 engages a notch edge 156 in the subplate notch 124 for compressing the third spring arm 144 until the fourth bend 150 extends into the notch 124. During removal, the other leading surface 152 engages the notch edge 156 for compressing the third spring arm 144 until the cover plate 112 is removed. The datum point of the third bend 146 aligns the fourth bends 150 for uniform engagement with the notches 124. The spring clips 118 can be designed to collectively require ten pounds of force, for example, during installation.

Referring to FIG. 4, an angle "A" relative to a reference plane which is a back surface of the decorative cover plate 112 can be between five and eighty five degrees, for example, for ease of assembly by the consumer. Similarly, an angle "B" relative to a reference plane will also be between five and eighty five degrees for maximum retention. It should be understood that these angles "A", "B" can be adjusted to balance both the ease of assembly and adequate retention force as defined by an application.

The design of the subplate 102 minimizes the size and location of apertures through the subplate to meet industry standards while also minimizing an overall size of the cover plate assembly 100 to minimize cost. The subplate 102 may be manufactured from a pre-galvanized stamped steel material having an overall height of at least 4.87 inches (123.70 millimeters) and an overall width of at least 3.12 inches (79.25 mm) for single gang wall plate configurations. Multiple gangs of 2, 3, 4 or any integer factor, are incrementally larger than a single gang by adding 1.812" (46.04 mm) per gang added. This approach leaves a limited access area where an interface or latching mechanism can be installed. Because of this limited area, the cover plate assembly 100 provides a fastener 118 arrangement that avoids high machining or manufacturing tolerances and secondary operations which would have increased production costs on a highly competitive and commoditized product.

Retention of the spring clips 118 into the decorative cover plate 112 is minimally affected by flexing of the third spring arm 144 when the decorative cover plate 112 is pressed onto the subplate 102. The spring clips 118 are employed because polymeric material wears and fatigues after a relatively small number of cycles. In addition, the limited access area leaves insufficient space to allow the plastic to flex without yielding.

Both regions 126, 128 of the spring clip 118 share one common wall. By using flat spring steel to manufacture the spring clip 118, galling between the points of contact are significantly minimized. This approach allows the notches 124 in the subplate 102 to be a simple stamped cutout with a relatively sharp edge 156 which enhances retention. A polymeric spring clip design would have required this sharp edge 156 to be chamfered or bent over to eliminate galling at the point of contact. To minimize total material usage, the subplate 102 may be made as small as permissible, yet still sufficiently cover the electrical box and meet the NEMA standard. This is accomplished by sizing a single gang subplate so that an overall height is at least 4.87 inches (123.70 mm) and an overall width is at least 3.120 inches (79.25 mm). The ratio between the long and short sides of the single gang subplate may be between 1.40 and 1.70. Multi-gang units would then be larger than the single gang by incrementing the width by 1.812" (46.04 mm) as required by the standard. The compactness of the cover plate assembly 100 results in various embodiments that remain within twelve percent of a ratio of height to width of the subplate 102 of 1.56.

A single wall plate can be sized to accept any number of electrical devices and in any combination thereof. The subplate 102 may meet all of the industry standard requirements while the decorative cover plate 112 can be made from any material to achieve its decorative purpose including but not limited to wood, plastic, glass, stone and resin. By doing so, the subplate 102 can be made in large volumes at relatively low cost and the decorative cover plate 112 avoids some of the restrictions imposed on electrical enclosures since those requirements are being accomplished by the subplate 102. The consumer benefits from this design since decorative cover plate designs can be changed out to suit a change in décor without removing the UL rated subplate 102. Models can be retailed which exclude the subplate 102 for customers which already have a subplate 102 installed, thereby removing the additional cost associated with that component.

Figure 7:
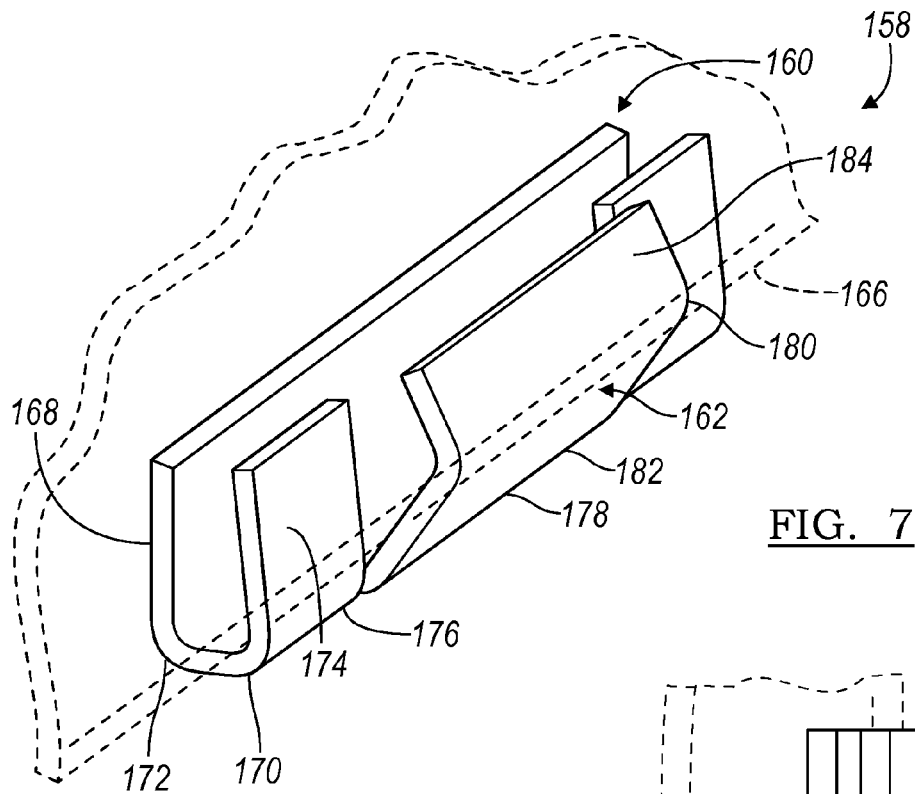
FIG. 7 is an enlarged perspective view of a fastener and a subplate of a cover plate assembly for a wall mounted electrical device according to another embodiment.
Figure 8:
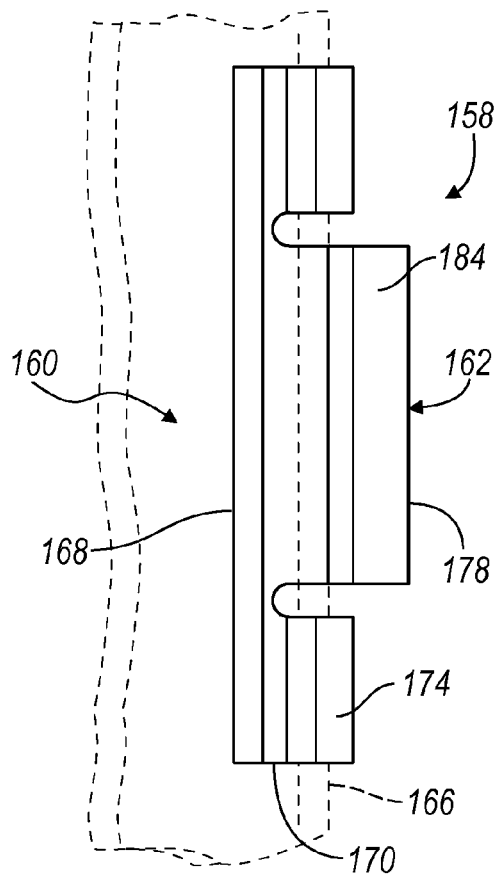
FIG. 8 is an enlarged rear view of the fastener and the subplate of the cover plate assembly of FIG. 7.
Figure 9:
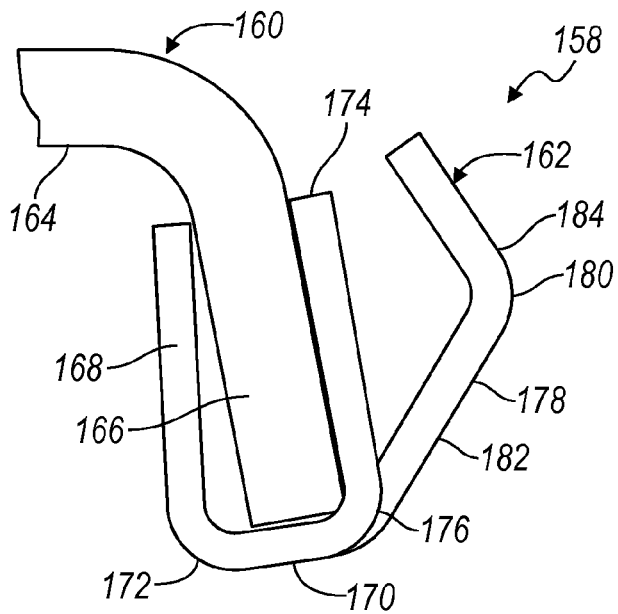
FIG. 9 is an enlarged section view of the subplate in engagement with the fastener of the cover plate assembly of FIG. 7.

FIGS. 7-9 illustrate a partial cover plate assembly 158 with a subplate 160 and a spring clip 162 according to another embodiment. The subplate 160 includes a substrate 164 and a rim 166 extending from the substrate 164. The substrate 164 mounts to an electrical device as described according to the prior embodiment, for example. The spring clip 162 includes a first spring arm 168 connected to an intermediate region 170 at a first bend 172. A pair of secondary spring arms 174 is connected to the intermediate region 170 at a second bend 176 to oppose the first spring arm 168. The spring clips 162 are oriented upon the subplate rim 166 with the first spring arm 168 disposed inboard of the rim 166. The attachment of the subplate 160 to the electrical device traps the spring clips 162 against the corresponding wall thereby retaining the spring clips 162.

The spring clips 162 also include a third spring arm 178 extending from the intermediate region 170 at the second bend 176 and in between the pair of secondary spring arms 174. The third spring arm 178 includes a third bend 180 for providing a pair of leading surfaces 182, 184 for cooperating with a rim and a detent within a cover plate.

Figure 10:
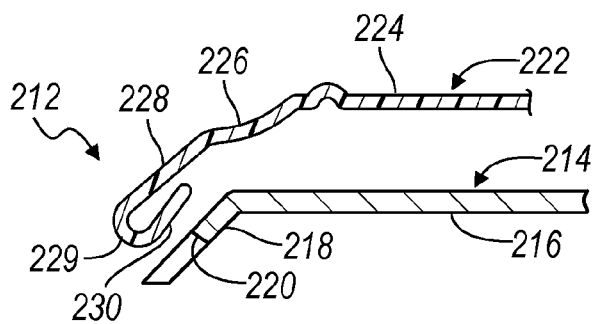
FIG. 10 is an enlarged, exploded partial section view of a cover plate assembly for a wall mounted electrical device according to another embodiment.
Figure 11:
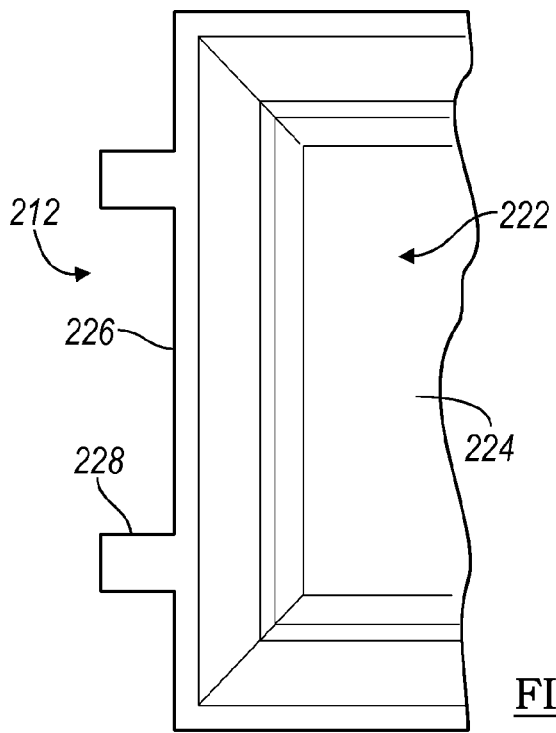
FIG. 11 is an enlarged partial elevation view of the cover plate assembly of FIG. 10.

With reference now to FIGS. 10 and 11, a cover plate assembly 212 is depicted according to another embodiment. The cover plate assembly 212 includes a subplate 214 with a substrate 216 mounted to a wall mounted electrical device, a rim 218 extending from the substrate 216, and a plurality of notches 220 formed within the rim. A cover plate 222 is provided with a substrate 224, a rim 226, and a plurality of integral spring clips 228.

The cover plate 222 may be thermoformed so that raw material use and cost is minimized since thermoforming is made from thin plastic sheet stock. Thermoforming can provide picture quality laminations for low cost decoration. Thermoformed sheet stock can be made in many colors. Tooling cost for thermoformed parts are minimal when compared to injection molding. The spring clips 228 can be formed from the same thermoformed part to be integral with the cover plate 222. The spring clips 228 can be formed with a first spring arm 229 and a second spring arm 230 for extending into the notch 220 as depicted. Alternatively, the spring clips 228 can replicate geometries of prior embodiments.

Figure 12:
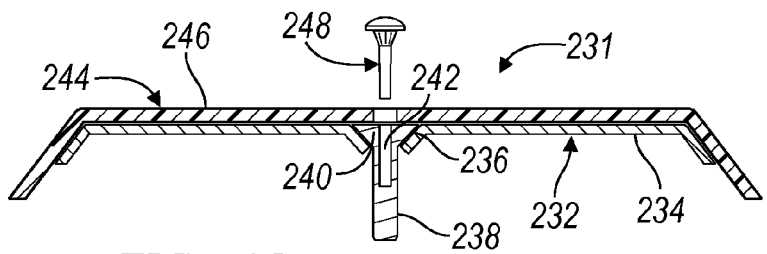
FIG. 12 is a partially exploded section view of a cover plate assembly for a wall mounted electrical device according to another embodiment.
Figure 13:
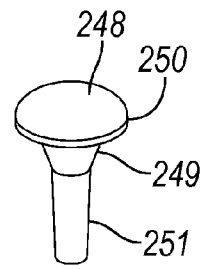
FIG. 13 is an enlarged perspective view of a fastener of the cover plate assembly of FIG. 12.

FIGS. 12 and 13 illustrate a cover plate assembly 231 according to another embodiment. A subplate 232 with a substrate 234 includes apertures 236 for fastening to a yoke of an electrical device. Screws 238 are provided with flat heads 240 with hexagonal sockets 242 for assembly with a hexagonal wrench. The sockets 242 have an extended depth. A decorative cover plate 244 has a substrate 246 with a fastener, such as a tack or a polymeric stud 248, extending from the substrate 246. The stud 248 (FIG. 13) includes a shoulder 249 under a head 250 that is oversized relative to a shank 251 for an interference fit within the socket 242.

Figure 14:
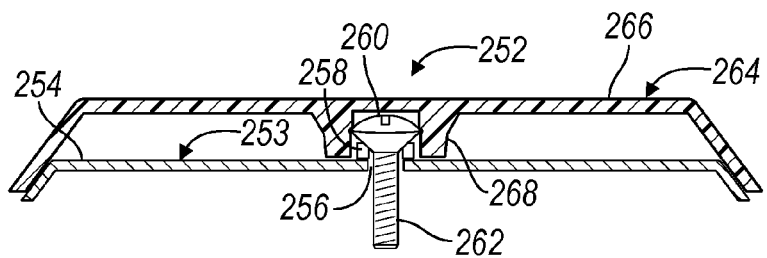
FIG. 14 is a partial section view of a cover plate assembly for a wall mounted electrical device according to another embodiment.
Figure 15:
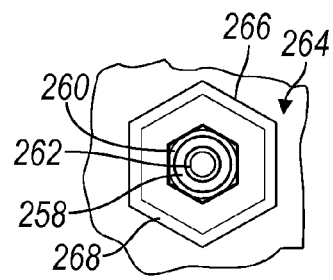
FIG. 15 is an enlarged rear section view of the cover plate assembly of FIG. 14.
Figure 16:
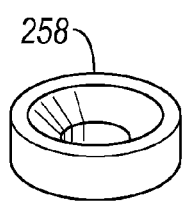
FIG. 16 is an enlarged perspective view of a fastener of the cover plate assembly of FIG. 14.

FIGS. 14-16 illustrate a cover plate assembly 252 according to another embodiment. A subplate 253 is provided with a substrate 254 with apertures 256 for fastening the subplate substrate 254 to an electrical device. A conical washer 258 is provided for spacing a head 260 of a screw 262 above the substrate 254. A cover plate 264 is provided with a substrate 266 with a polymeric hexagonal receptacle 268 that is undersized relative to the screw head 260 to affix the receptacle 268 upon the screw head 260. Alternatively, the receptacle 268 may be sized to affix to the washer 258. The washer 258 may be slotted for installation without removal of the screw 262.

Figure 17:
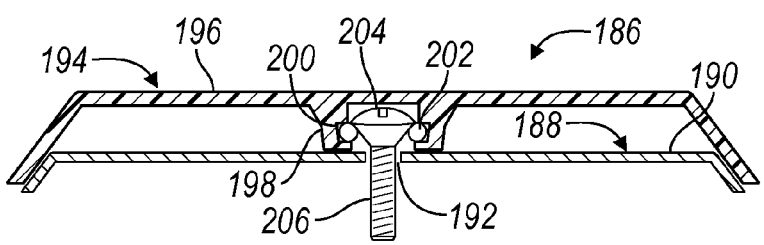
FIG. 17 is a partial section view of a cover plate assembly for a wall mounted electrical device according to another embodiment.
Figure 18:
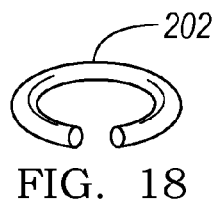
FIG. 18 is an enlarged perspective view of a fastener of the cover plate assembly of FIG. 17.

FIGS. 17 and 18 illustrate a cover plate assembly 186 according to another embodiment. A subplate 188 is provided with a substrate 190 with apertures 192 for fastening the subplate substrate 190 to an electrical device. A cover plate 194 is provided with a substrate 196 with a receptacle 198 with a groove 200 formed therein. A split ring retainer 202 (FIG. 18) is retained within the groove 200. The retainer 202 may be formed from a steel or material. The retainer 202 may be sized to receive a head 204 of a screw 206 therein for retention of the cover plate 194 upon the subplate 188. Thus, the screw 206 is not advanced axially into engagement with the subplate 188; and the split ring retainer 202 is pressed over the screw head 204.

Figure 19:
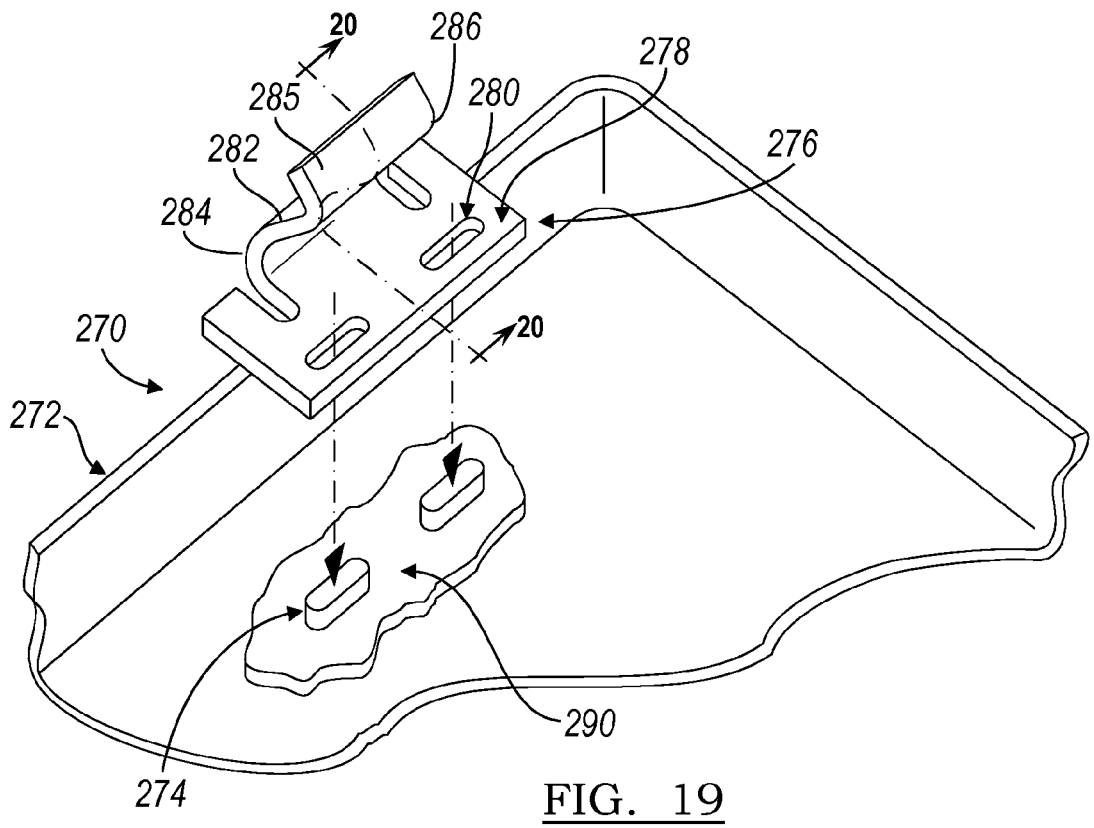
FIG. 19 is an enlarged, partially exploded perspective view of a cover plate assembly for a wall mounted electrical device according to another embodiment.
Figure 20:
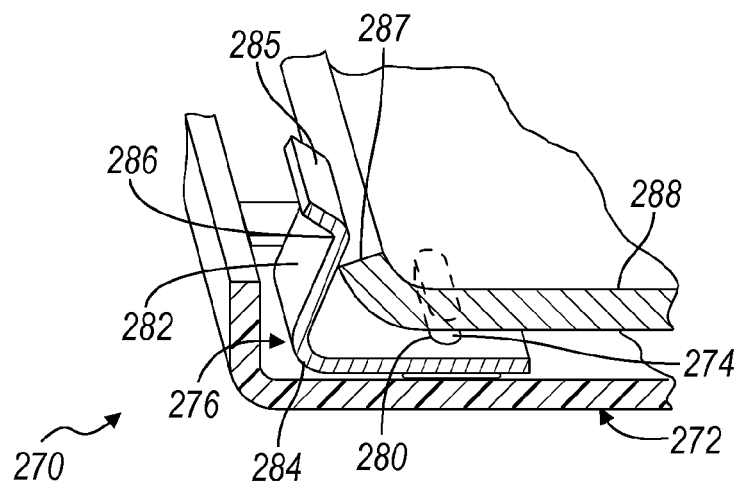
FIG. 20 is an enlarged, partial section view of the cover plate assembly of FIG. 19.

FIGS. 19-20 depict a cover plate assembly 270 according to another embodiment. A cover plate 272 is provided with a pair of posts 274 instead of a receptacle. The posts 274 may be more reasonable to manufacture than receptacles for difficult to form materials, such as glass, ceramic and resin. A spring clip 276 is provided with a base 278 with apertures 280 for locating the spring clip 276 upon the posts 274. A first spring arm 282 extends from the base 278 at a first bend 284; and a second spring arm 285 extends from the first spring arm 282 at a second bend 286 to engage a notch 287 in a subplate 288. An adhesive 290 may be deposited upon the cover plate 272 adjacent the posts 274 for adhering the base 278 to the substrate 266.

Figure 31:
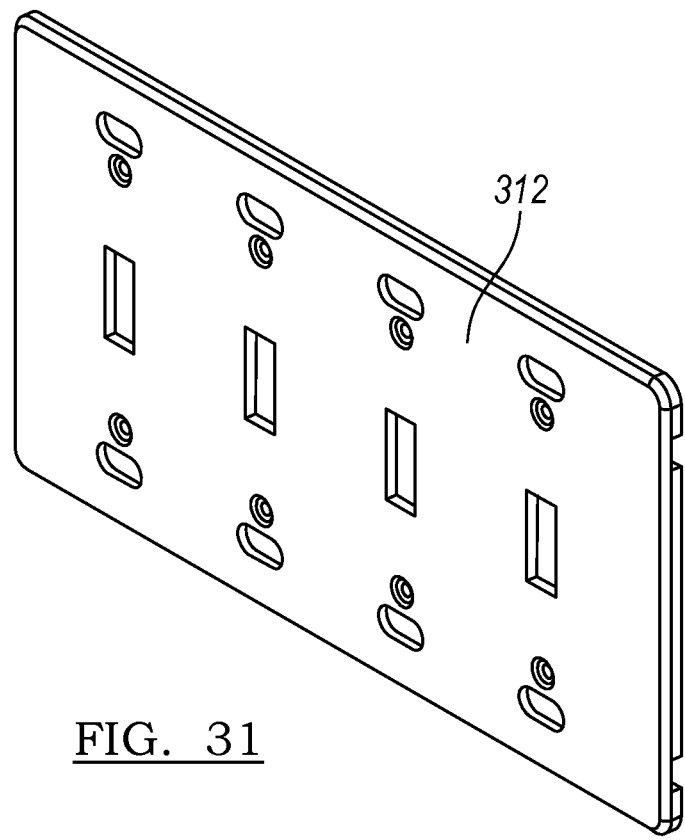
FIG. 31 is a perspective view of a subplate of a cover plate assembly for a wall mounted electrical device according to another embodiment.

FIGS. 21-31 depict various subplates that employ the fastener arrangements disclosed herein to illustrate the versatility of the embodiments. These figures do not depict every embodiment; rather are included to illustrate the arrangements for common electrical devices. The subplates include a single junction box blank subplate 292 (FIG. 21); a single switch subplate 294 (FIG. 22); a single duplex outlet subplate 296 (FIG. 23); a single décor switch subplate 298 (FIG. 24); a double junction box blank subplate 300 (FIG. 25); a double switch subplate 302 (FIG. 26); a single switch/single duplex outlet subplate 304 (FIG. 27); a single switch/single décor subplate 306 (FIG. 28); a double duplex outlet subplate 308 (FIG. 29); a double décor switch subplate 310 (FIG. 30); and a quadruple switch subplate 312 (FIG. 31).

Figure 21:
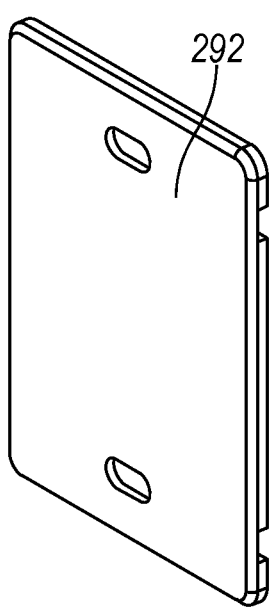
FIG. 21 is a perspective view of a subplate of a cover plate assembly for a wall mounted electrical device according to another embodiment.
Figure 22:
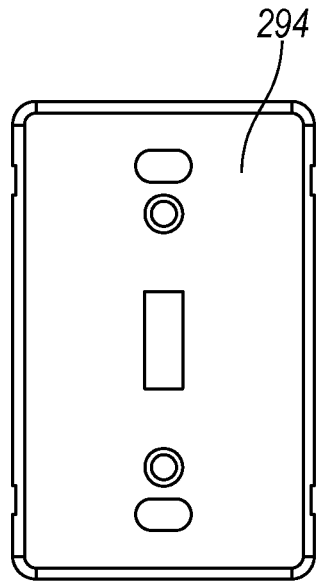
FIG. 22 is an elevation view of a subplate of a cover plate assembly for a wall mounted electrical device according to another embodiment.
Figure 23:
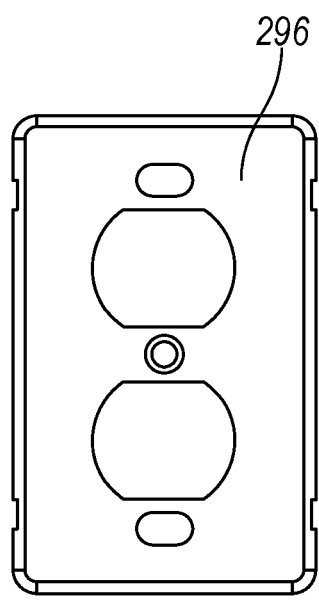
FIG. 23 is an elevation view of a subplate of a cover plate assembly for a wall mounted electrical device according to another embodiment.
Figure 24:
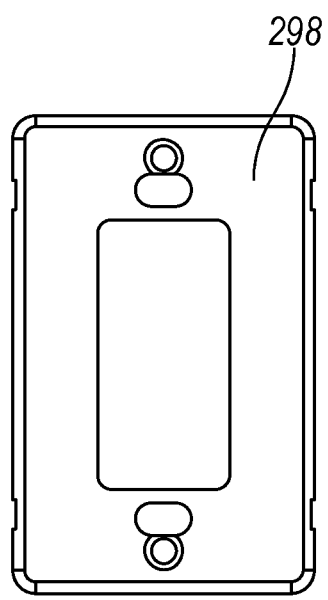
FIG. 24 is an elevation view of a subplate of a cover plate assembly for a wall mounted electrical device according to another embodiment.
Figure 25:
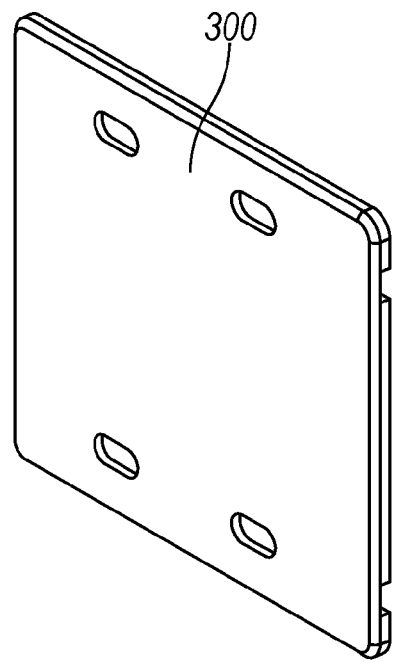
FIG. 25 is a perspective view of a subplate of a cover plate assembly for a wall mounted electrical device according to another embodiment.
Figure 26:
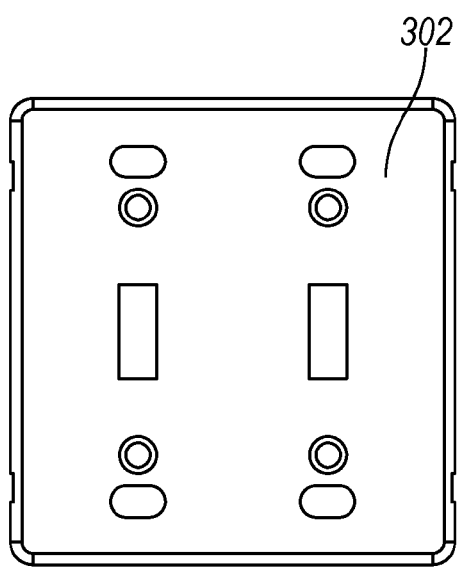
FIG. 26 is an elevation view of a subplate of a cover plate assembly for a wall mounted electrical device according to another embodiment.
Figure 27:
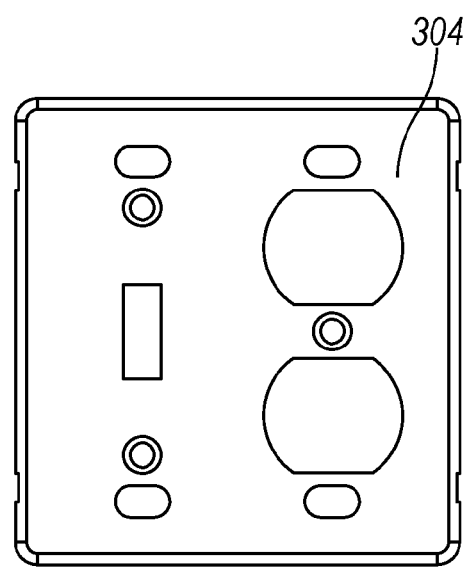
FIG. 27 is an elevation view of a subplate of a cover plate assembly for a wall mounted electrical device according to another embodiment.
Figure 28:
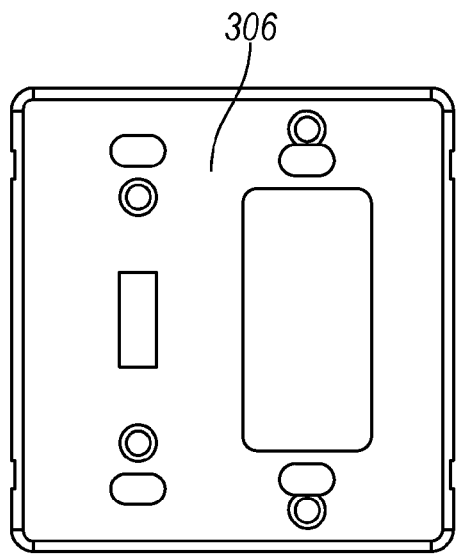
FIG. 28 is an elevation view of a subplate of a cover plate assembly for a wall mounted electrical device according to another embodiment.
Figure 29:
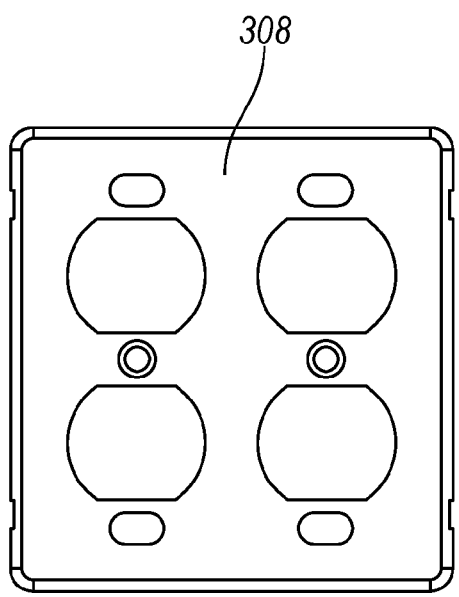
FIG. 29 is an elevation view of a subplate of a cover plate assembly for a wall mounted electrical device according to another embodiment.
Figure 30:
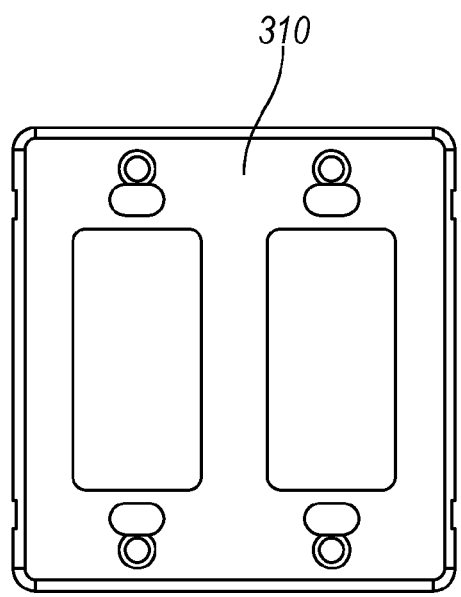
FIG. 30 is an elevation view of a subplate of a cover plate assembly for a wall mounted electrical device according to another embodiment.
Figure 32:
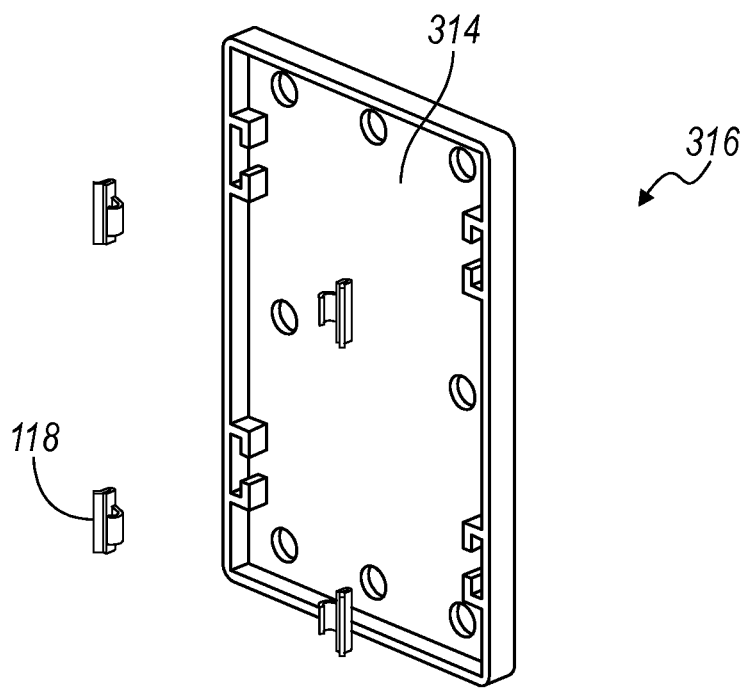
FIG. 32 is an exploded perspective view of a cover plate and fasteners for a cover plate assembly for a wall mounted electrical device according to another embodiment.
Figure 36:
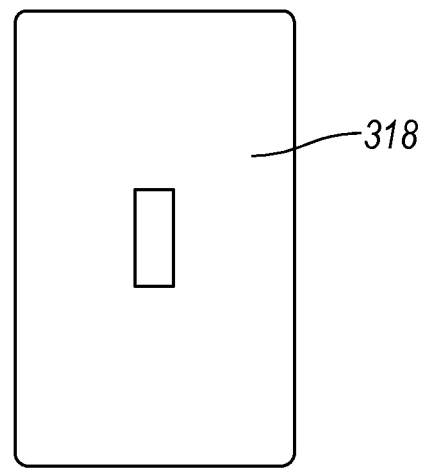
FIG. 36 is a front elevation view of a cover plate for a cover plate assembly for a wall mounted electrical device according to another embodiment.
Figure 37:
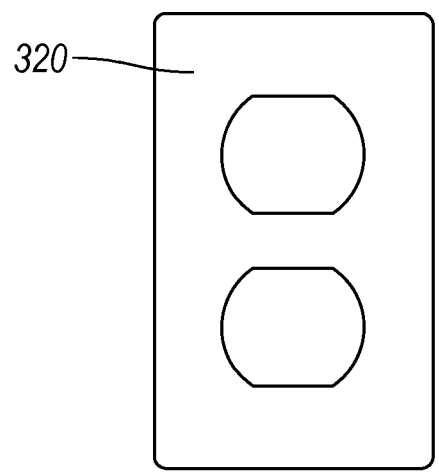
FIG. 37 is a front elevation view of a cover plate for a cover plate assembly for a wall mounted electrical device according to another embodiment.
Figure 38:
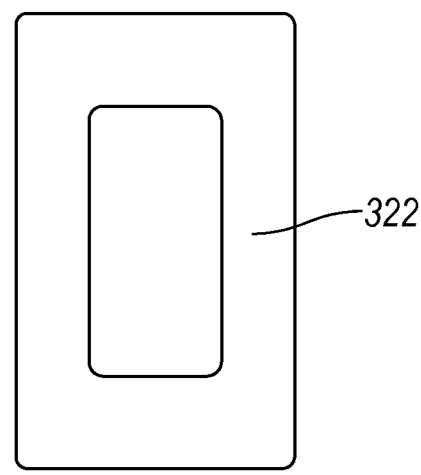
FIG. 38 is a front elevation view of a cover plate for a cover plate assembly for a wall mounted electrical device according to another embodiment.
Figure 39:
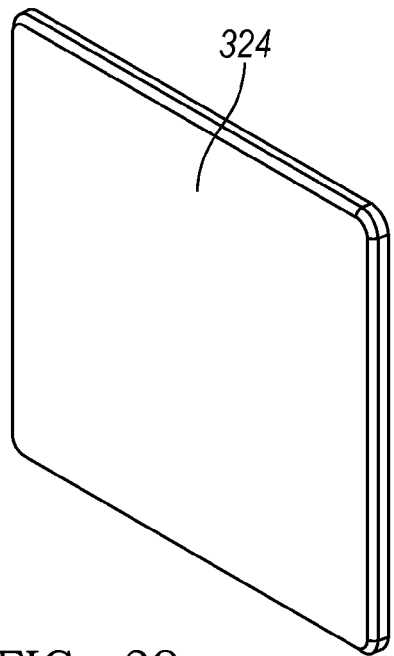
FIG. 39 is a perspective view of a cover plate assembly for a wall mounted electrical device according to another embodiment.
Figure 40:
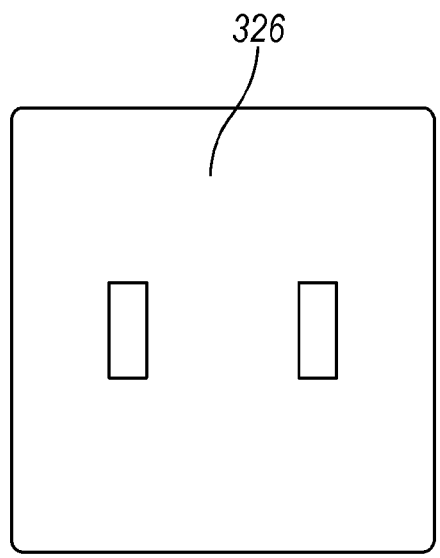
FIG. 40 is a front elevation view of a cover plate for a cover plate assembly for a wall mounted electrical device according to another embodiment.
Figure 41:
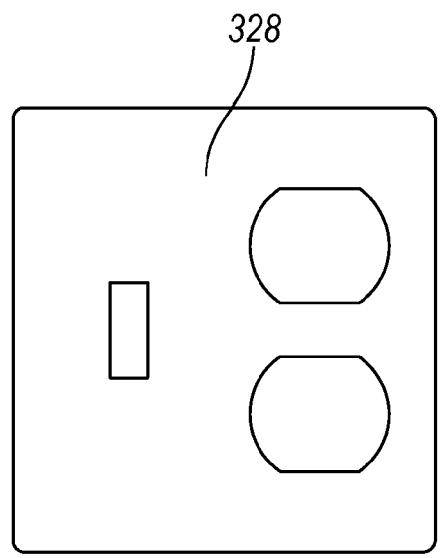
FIG. 41 is a front elevation view of a cover plate for a cover plate assembly for a wall mounted electrical device according to another embodiment.

FIG. 32 illustrates a cover plate 314 and spring clips 118 for a cover plate assembly 316 for a single junction box blank to affix to the subplate 292 of FIG. 21. The cover plate 314 is also illustrated in FIGS. 33-35.

Figure 45:
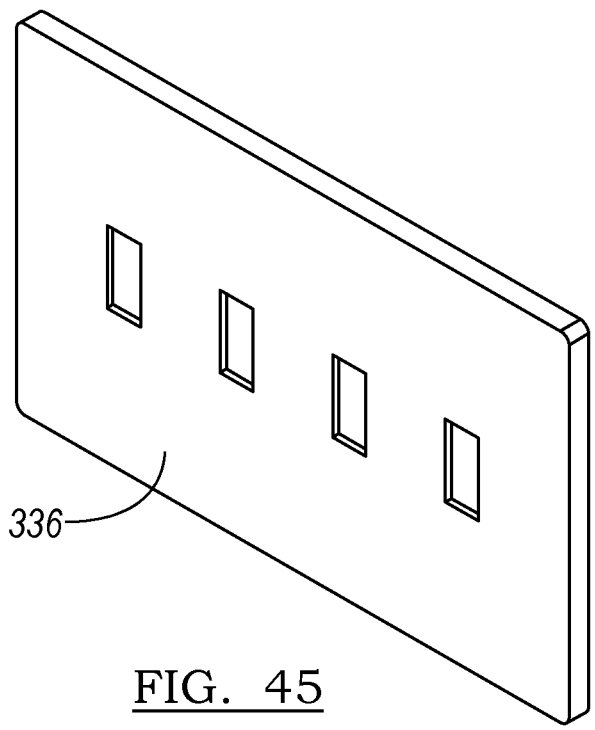
FIG. 45 is a front perspective view of a cover plate assembly for a wall mounted electrical device according to another embodiment.

FIGS. 36-45 illustrate cover plates for the subplates 294-312 of FIGS. 22-31 respectively. Referring to FIGS. 36-45, the various cover plates are illustrated as a single switch cover plate 318 (FIG. 36); a single duplex outlet cover plate 320 (FIG. 37); a single décor switch cover plate 322 (FIG. 38); a double junction box blank cover plate 324 (FIG. 39); a double switch cover plate 326 (FIG. 40); a single switch/single duplex outlet cover plate 328 (FIG. 41); a single switch/single décor cover plate 330 (FIG. 42); a double duplex outlet cover plate 332 (FIG. 43); a double décor switch cover plate 334 (FIG. 44); and a quadruple switch cover plate 336 (FIG. 45).

Figure 46:
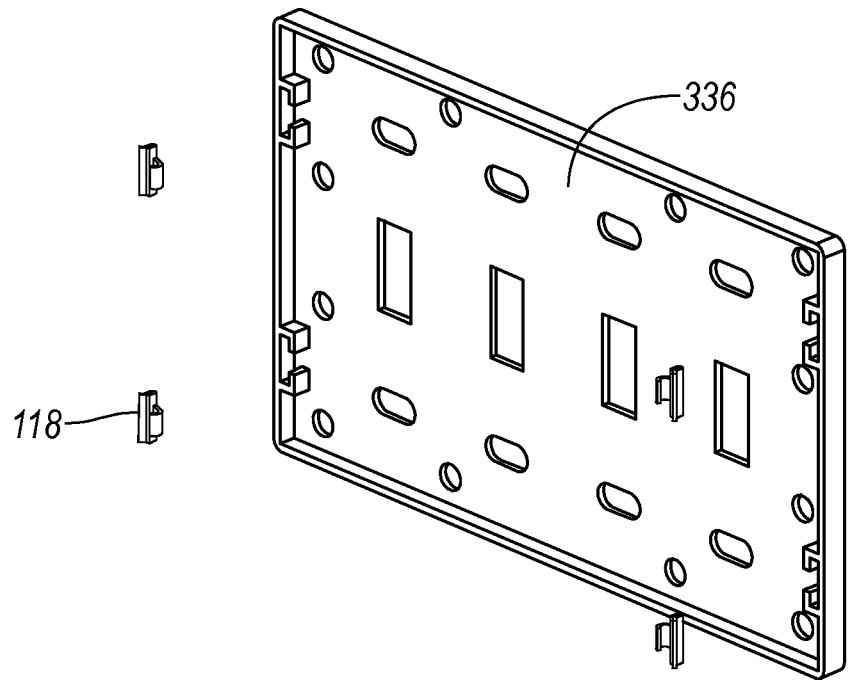
FIG. 46 is an exploded perspective view of the cover plate assembly of FIG. 45.

FIG. 46 illustrates a rear side of the quadruple switch cover plate 336 with spring clips 118 for fastening to the quadruple switch subplate 312 of FIG. 31. Although four spring clips 118 are illustrated for this and other embodiments, the spring clips 118 can be designed and/or an appropriate number of spring clips 118 can be employed for each embodiment to obtain the necessary attachment force.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cover plate assembly comprising:
a cover plate with a substrate adapted to be mounted upon a substrate of a subplate mounted to an electrical device to enclose the electrical device, and a rim extending from a periphery of the cover plate substrate;
at least one fastener engaged with the cover plate to engage at least one detent in an outer periphery of the subplate to fasten the cover plate to the subplate, wherein the at least one fastener is a separate component than the cover plate and the subplate, and the at least one fastener is concealed beneath the cover plate;
wherein the at least one fastener further comprises at least one spring clip;
a subplate with a substrate adapted to be mounted to an electrical device to enclose the electrical device, and with a rim extending from a periphery of the substrate;
wherein the at least one spring clip further comprises a first spring arm and an opposed second spring arm with a first bend therebetween to receive the subplate rim between the first spring arm and the second spring arm in engagement with the first bend for retention of the at least one spring clip against a wall; and
wherein the at least one spring clip further comprises a third spring arm extending for engagement with the cover plate.

2. The cover plate assembly of claim 1 wherein the cover plate has at least one receptacle formed within the rim to retain the at least one fastener.

3. The cover plate assembly of claim 1 further comprising an adhesive adhering the at least one fastener to the cover plate.

4. The cover plate assembly of claim 1 wherein a ratio of height to width of the subplate is within twelve percent of 1.56.

5. The cover plate assembly of claim 1 wherein the cover plate is formed from a different material than the subplate.

6. The cover plate assembly of claim 1 wherein the at least one fastener is formed from a different material than the subplate.

7. The cover plate assembly of claim 1 wherein the subplate substrate has a thickness of less than 2.5 millimeters.

8. The cover plate assembly of claim 1 wherein the subplate substrate has a thickness of approximately 0.8 millimeters.

9. The cover plate assembly of claim 1 wherein the at least one detent is further defined as at least one notch formed in the rim.

10. The cover plate assembly of claim 1 wherein the cover plate has at least one receptacle formed within the rim to retain the at least one spring clip.

11. The cover plate assembly of claim 10 wherein the first spring arm and the second spring arm are in compression for installation and retention within the at least one receptacle.

12. The cover plate assembly of claim 11 wherein the rim includes at least one detent formed therein; and
wherein the third spring arm is in compression during installation for expansion into the at least one detent for installation and retention upon the subplate.

13. The cover plate assembly of claim 12 wherein the at least one spring clip further comprises a second bend between the second spring arm and the third spring arm.

14. The cover plate assembly of claim 13 wherein the second bend is in contact with a rear surface of the cover plate for locating the at least one spring clip.

15. The cover plate assembly of claim 14 wherein the at least one spring clip further comprises a third bend in the third spring arm for providing a leading edge along the third spring arm for engagement with the subplate rim for compression of the third spring arm during installation, whereby the third spring arm at least partially expands into the at least one detent for retaining the cover plate to the subplate.

16. A cover plate assembly comprising:
a subplate with a substrate adapted to be mounted to an electrical device for enclosing the electrical device, and a rim extending from a periphery of the substrate, the rim having at least one detent formed into an outer periphery thereof;
a cover plate with a substrate adapted to be mounted upon the subplate substrate, and a rim extending from a periphery of the cover plate substrate, the rim having at least one receptacle formed therein;
at least one spring clip retained in the at least one receptacle and engaged with the at least one detent for fastening the cover plate to the subplate;
wherein the at least one spring clip further comprises a first spring arm and an opposed second spring arm with a first bend therebetween to receive the subplate rim between the first spring arm and the second spring arm in engagement with the first bend for retention of the at least one spring clip against a wall; and
wherein the at least one spring clip further comprises a third spring arm extending for engagement with the cover plate.

* * * * *